(12) United States Patent
Braun et al.

(10) Patent No.: US 8,774,099 B2
(45) Date of Patent: Jul. 8, 2014

(54) BASE STATION AND METHOD FOR ALLOCATING HS-DSCH CHANNELISATION CODES IN A WIRELESS COMMUNICATION SYSTEM

(75) Inventors: Volker Braun, Stuttgart (DE); Dietrich Zeller, Sindelfingen (DE)

(73) Assignee: Alcatel Lucent, Paris (FR)

( * ) Notice: Subject to any disclaimer, the term of this patent is extended or adjusted under 35 U.S.C. 154(b) by 2485 days.

(21) Appl. No.: 11/446,264

(22) Filed: Jun. 5, 2006

(65) Prior Publication Data

US 2007/0008933 A1    Jan. 11, 2007

(30) Foreign Application Priority Data

Jul. 5, 2005    (EP) ..................................... 05291455

(51) Int. Cl.
*H04W 4/00*        (2009.01)
(52) U.S. Cl.
USPC ........ 370/329; 370/310.2; 370/331; 455/429; 455/436; 455/438; 455/561
(58) Field of Classification Search
USPC ............... 370/310.2, 329, 331–334; 455/429, 455/436, 438, 561
See application file for complete search history.

(56) References Cited

U.S. PATENT DOCUMENTS

| | | | |
|---|---|---|---|
| 5,953,668 A | 9/1999 | Reilly et al. | |
| 6,163,524 A * | 12/2000 | Magnusson et al. | 370/208 |
| 6,552,996 B2 * | 4/2003 | Kim et al. | 370/209 |
| 6,693,952 B1 * | 2/2004 | Chuah et al. | 375/140 |
| 6,885,691 B1 * | 4/2005 | Lyu | 375/130 |
| 6,898,431 B1 * | 5/2005 | Peele | 455/453 |
| 7,206,332 B2 * | 4/2007 | Kwan et al. | 375/140 |
| 7,317,700 B2 * | 1/2008 | Hwang | 370/328 |
| 2002/0051437 A1 * | 5/2002 | Take | 370/335 |
| 2003/0105894 A1 | 6/2003 | Gredone et al. | |

FOREIGN PATENT DOCUMENTS

WO    WO 03/107707 A    12/2003

OTHER PUBLICATIONS

A. Richardson, "WCDMA design handbook," Cambridge University Press, chapter 3.3.8, pp. 82-85 (2005).

* cited by examiner

*Primary Examiner* — Steve D Agosta
(74) *Attorney, Agent, or Firm* — Fay Sharpe LLP

(57) ABSTRACT

A method for allocating HS-DSCH channelization codes in WCDMA based wireless communication system using HSDPA in which a total number of N HS-DSCH channelization codes are available. M<N HS-DSCH channelization codes are allocated upon request by a RNC such that a node B can service UE's. The node B identifies which of the HS-DSCH channelization codes are currently unused for transmissions and autonomously allocates at least one of the unused HS-DSCH channelization codes for servicing UE's.

10 Claims, 3 Drawing Sheets

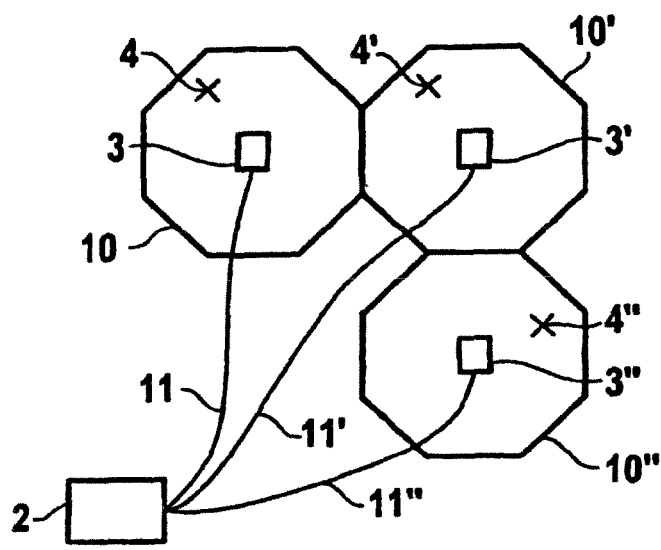
Fig. 1
(Prior Art)
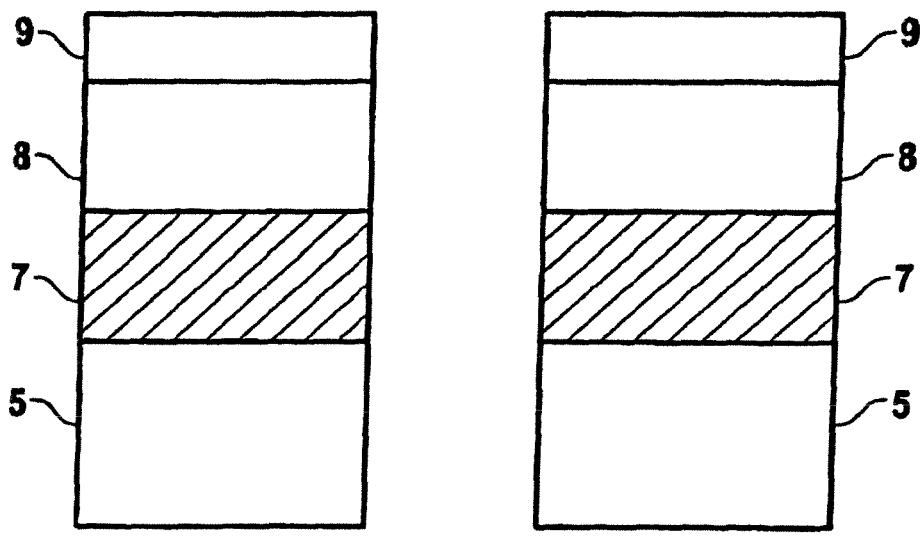
Fig. 2a
(Prior Art)
Fig. 2b
(Prior Art)

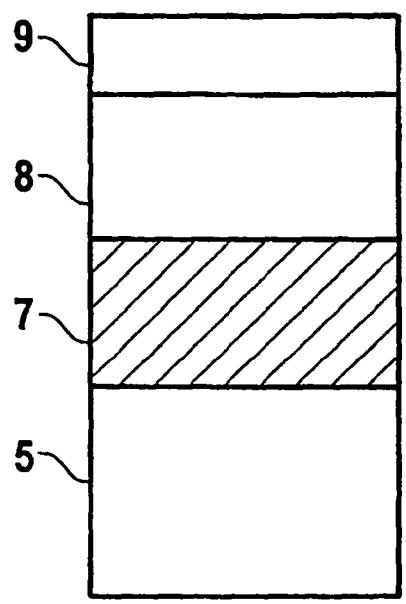
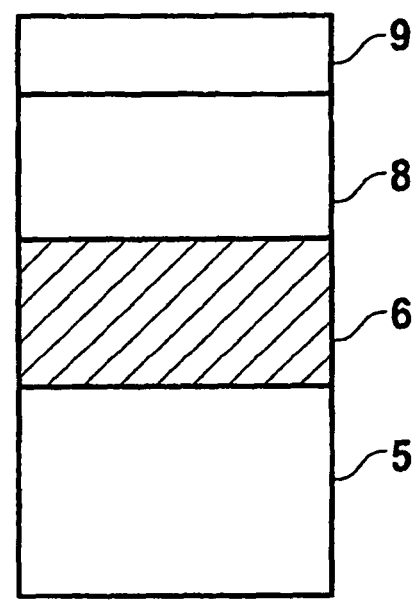
Fig. 4a   Fig. 4b

BASE STATION AND METHOD FOR ALLOCATING HS-DSCH CHANNELISATION CODES IN A WIRELESS COMMUNICATION SYSTEM

FIELD OF THE INVENTION

The invention is based on a priority application EP 05291455.3 which is hereby incorporated by reference.

The invention refers to a wireless communication system using WCDMA and offering HSDPA as a packet-based service. In particular the invention refers to a wireless communication system operating in the UTRA/FDD mode of WCDMA and offering HSDPA.

BACKGROUND AND PRIOR ART

High speed downlink packet access (HSDPA) supports the introduction of high bit rate data services in WCDMA (wideband code division multiple access) based communication systems which will increase network capacity while minimizing operator's investment. It provides a smooth evolutionary path for universal mobile telecommunication system (UMTS) networks to higher data rates and higher capacities. The introduction of shared channels for different users offers the possibility to use channel resources more efficiently in the packet domain, which is at the same time less expensive for users than dedicated channels.

The higher data rate will be achieved by using a higher modulation technique (16-QAM), new methods of error correction and a highly dynamic allocation of physical resources through the MAC (medium access control) layer. This modified MAC layer is called MAC-hs and is implemented in the base station, which in the UMTS case is also referred to as a node B.

The new layer MAC-hs needs to know the available channelisation codes which are also called WCDMA spreading codes. According to a standard established by the third generation partnership project (3GPP), 3GPP Release 5, the channelisation codes available for the HS-DSCH (high speed downlink shared transport channel) packet scheduling in a radio cell are explicitly signalled by the RNC (radio network controller) to the node B. It is assumed that the node B transmits HS-DSCH using exactly these channelisation codes signalled by the RNC for the HSDPA packet scheduling in a cell, and no other channelisation codes. This higher signalling is defined in the 3GPP document 3GPP TS 25.433 NBAP. It should be noted that the set of channelisation Codes available for HS-DSCH scheduling in a cell is not known to the user equipments (UEs) in the cell.

SUMMARY OF THE INVENTION

It is an object of the invention to provide a radio resource management (RRM) scheme in a WCDMA based communication system offering HSDPA with less signalling between the RNC and the node B which at the same time uses the radio resources more efficiently.

According to the invention the above mentioned problem is solved by a method for allocating HS-DSCH channelisation codes in a WCDMA based wireless communication system using HSDPA having N (N being an integer) HS-DSCH channelisation codes and whereby three steps are performed. In a first step M<=N (M being an integer) HS-DSCH channelisation codes are allocated to a node B by a radio network controller such that a node B can service user equipments. In a second step the node B identifies which of the N-M channelisation codes are currently unused for transmission. In a third step the node B autonomously allocates at least one of the N-M unused channelisation codes for servicing user equipments.

The method according to the invention is based on the idea that a wireless communication system using HSDPA has a total number of N HS-DSCH channelisation codes. In the UTRA/FDD mode of WCDMA orthogonal channelisation codes of variable length are used. These codes are organized in a code tree. If a code with a code length of SF=16 is chosen (SF is the spreading factor), this code is the root of two codes of length 32 and so on. HS-DSCH channels are transmitted with a fixed spreading factor of 16. This has the consequence that a total number of 16 channelisation codes are available for the system. These 16 channelisation codes represent the code space available in the cell, whereby the 16 channelisation codes are shared between common channels (for example broadcast channels or pilot channels), dedicated channels (DCH's), and HS channels. HS channels might be HS-SCCH channels (high speed shared common control channels) or HS-PDSCH channels (high speed physical downlink shared channels). As can be derived from this explanation a total number of N<16 channelisation codes is available for HS-DSCH. This invention refers to this subset of N<16 channelisation codes which are called the HS-DSCH channelisation codes.

As in the prior art these N HS-DSCH channelisation codes can be allocated by a network controller. This is done in the usual way that the RNC informs the node B that he should service user equipments by using these channelisation codes. However, depending on the downlink traffic not all of the N HS-DSCH channelisation codes may explicitly be allocated to the node B. Depending on the downlink traffic only a subset of the N HS-DSCH channelisation codes may explicitly be allocated. This subset will be called the minimum HS-DSCH code set and consists of M<=N channelisation codes with M being an integer.

In a second step the node B identifies which of the N-M HS-DSCH channelisation codes are currently unused for transmissions. Thus, the N-M HS-DSCH channelisation codes are neither used for the transmission of common channels, nor for dedicated channels, nor for orthogonal channel noise simulation (OCNS) channels. These unused HS-DSCH channelisation codes represent channelisation codes which could be used for servicing UEs. The unused HS-DSCH channelisation codes have been neglected in the prior art and represent unused radio resources characteristic of an inefficient system not making full use of its radio resources.

According to the invention the N-M unused HS-DSCH channelisation codes are used by the node B in the sense that the node B is allowed to autonomously allocate at least one of the N-M unused channelisation codes for servicing user equipments. The node B is given the possibility to service user equipments within a cell with the unused HS-DSCH channelisation codes in order to use unused radio resources more efficiently. The code set consisting of the above-mentioned N-M HS-DSCH channelisation codes allocatable by the node B shall be called the extended HS-DSCH code set.

In a preferred embodiment of the invention the system is a WCDMA system, in particular a WCDMA system operating in the UTRA/FDD mode. In the alternative the system is a CDMA 2000 system. As can be derived from the above paragraphs the system is using HSDPA.

In a preferred embodiment of the invention the system is providing HSDPA according to the standard 3GPP Release 5 or beyond. In this respect the method according to the invention is compatible with this industry standard. This means that when the method is carried out nothing has changed from a perspective of the RNC. Only when viewed from the perspective of the node B unused resources are used. In this respect, the method suggested above uses the flexibility and scope offered by the above mentioned 3GPP standard.

The extended HS-DSCH code set is variable in size. If, for example, the RNC allocates an additional HS-DSCH channelisation code which had been member of the extended HS-DSCH code set before, the RNC is free to do so. In this case the node B simply excludes this additional HS-DSCH channelisation code from the extended HS-DSCH code set such that it becomes a HS-DSCH channelisation code of the minimum HS-DSCH code set. By doing that the number of HS-DSCH channelisation codes within the minimum HS-DSCH code set is increased by 1, and the number of HS-DSCH channelisation codes within the extended HS-DSCH code set is reduced by 1. Furthermore it has to be taken into account that the number of dedicated channels which are used to serve UE's varies. Establishing additional dedicated channels reduces the extended HS-DSCH code set as well as the code space is shared between common channels, dedicated channels and HS channels.

It is to be expected that the minimum HS-DSCH channelisation code set defined by the RNC needs only infrequent modifications. The reason is that the channelisation code space available in a cell cannot be fully used for the transmission of common channels or dedicated channels such that the minimum HS-DSCH channelisation code set is defined in a rather static way. As a consequence the higher layer signalling overhead, i.e. the signalling between the RNC and the node B for the allocation of HS-DSCH channelisation codes, is particularly low.

An advantage of the above-mentioned approach is that a method in which HS-DSCH channelisation codes are added or removed to or from the extended HS-DSCH code set is much faster than a dynamic HS-DSCH channelisation code sharing with RNC involvement. In most cases it takes only update periods down to two milliseconds to add or remove a HS-DSCH channelisation code to or from the extended HS-DSCH code set. As can be derived from the above paragraphs the node B autonomously allocates these HS-DSCH channelisation codes to the extended HS-DSCH code set. This means, that this is done without intervention by the RNC.

In a preferred embodiment of the invention the extended HS-DSCH code set is chosen to be a contiguous set of HS-DSCH channelisation codes. This has the advantage that the method is compatible with the 3GPP Release 5 standard. The reason is that the HS-SCCH physical layer signalling being part of the 3GPP Release 5 standard can without modifications cope with several contiguous sets of channelisation codes under the constraint that each user equipment addressed via HS-SCCH must use a contiguous set of channelisation codes.

CDMA systems typically apply orthogonal spreading codes for downlink channel separation, e.g. Walsh or Hadamard codes, or the OVSF channelisation codes used in UTRA/FDD downlink.

An OVSF channelisation code $CSF_{SF,i}$ has two indexes SF and i. The first index is an integer and denotes the spreading factor which might be 16. In the case of SF=16 the length of the channelisation code is 16 chips. The second index i is an integer running from 0 to SF-1. The second index is defined by the regressive algorithm with which the OVSF code tree is defined, confer for example the book by A. Richardson: WCDMA design handbook, Cambridge University Press, 2005 in chapter 3.3.8.

A contiguous code set in the sense of the penultimate paragraph means that the set of channelisation codes are contiguous numbers as far as a second index is concerned. As an example, the set ($C_{16,0}$, $C_{16,1}$, $C_{16,2}$, $C_{16,3}$) and the set ($C_{16,12}$, $C_{16,13}$, $C_{16,14}$, $C_{16,15}$) are contiguous channelisation codes sets as the second indices 0, 1, 2, 3 and 12, 13, 14, 15 respectively are contiguous numbers when they are sorted in size.

a) In a preferred embodiment of the invention the channelisation codes for channelisation codes $C_{SF,0}$, $C_{SF,1}$, $C_{SF,2}$, ..., $C_{SF,SF-1}$ of a channelisation code tree with SF being the spreading factor are used in the following way: the codes $C_{SF,SF-1}$ ... $C_{SF,SF-M}$ are chosen for the minimum HS-DSCH code set (5), b) the codes $C_{SF,SF-1-M}$ ... $C_{SF,SF-N}$ are chosen for the extended HS-DSCH code set (6), c) the codes $C_{SF,SF-1-N}$ ... $C_{SF,SF-k}$ (8) are chosen for DCH and HS-SCCH, d) the codes $C_{SF,SF-1-k}$ ... $C_{SF,0}$ (9) are chosen for common channels.

M and k are integers with M<N<k<SF. The channelisation codes contained in the channelisation codes sets a) and b) represent the N HS-DSCH channelisation codes available in the cell. Depending on the downlink traffic this number N of available HS-DSCH channelisation codes might be in the rage of 0 . . . 15.

As can be derived from the above description the channelisation code sets a) to d) are contiguous code sets. With this allocation scheme the probability that a contiguous set of unused channelisation codes can be used as an extended HS-DSCH code set is maximized.

Another aspect of the invention is a node B carrying out the method as described above. The node B is a base station according to the WCDMA standard and comprises a computer program product which arranges the node B to carry out the method described above. The computer program product is directly loadable in the internal memory of the node B and comprises software code portions for performing the method described above.

It has to be emphasized that the method described above can be applied with conventional UEs and with conventional RNC's. This means that the efforts necessary for arranging an existing UMTS system to carry out the method described therein are negligible. It is even likely that the call admission control (CAC) algorithm implemented in the RNC can, if desired, be simplified. The reason is that for the CAC algorithms only the minimum HS-DSCH channelisation code set has to be taken into account.

These and other aspects of the invention will be apparent from and elucidated with reference to the embodiments described thereafter. It should be emphasised that the use of reference signs shall not be construed as limiting the scope of the invention.

BRIEF DESCRIPTION OF THE DRAWINGS

FIG. 1 shows a wireless communication system according to the prior art,

FIG. 2a shows the conventional RRM scheme for HSDPA from perspective of the RNC according to the prior art, FIG. 2b shows the conventional RRM scheme for HSDPA from the perspective of the node B according to the prior art, FIG. 4a shows the RRM scheme from the perspective of the RNC, FIG. 4b shows the RRM scheme from the perspective of the node B.

DETAILED DESCRIPTION OF THE DRAWINGS AND OF THE PREFERRED EMBODIMENTS

Figure 3:
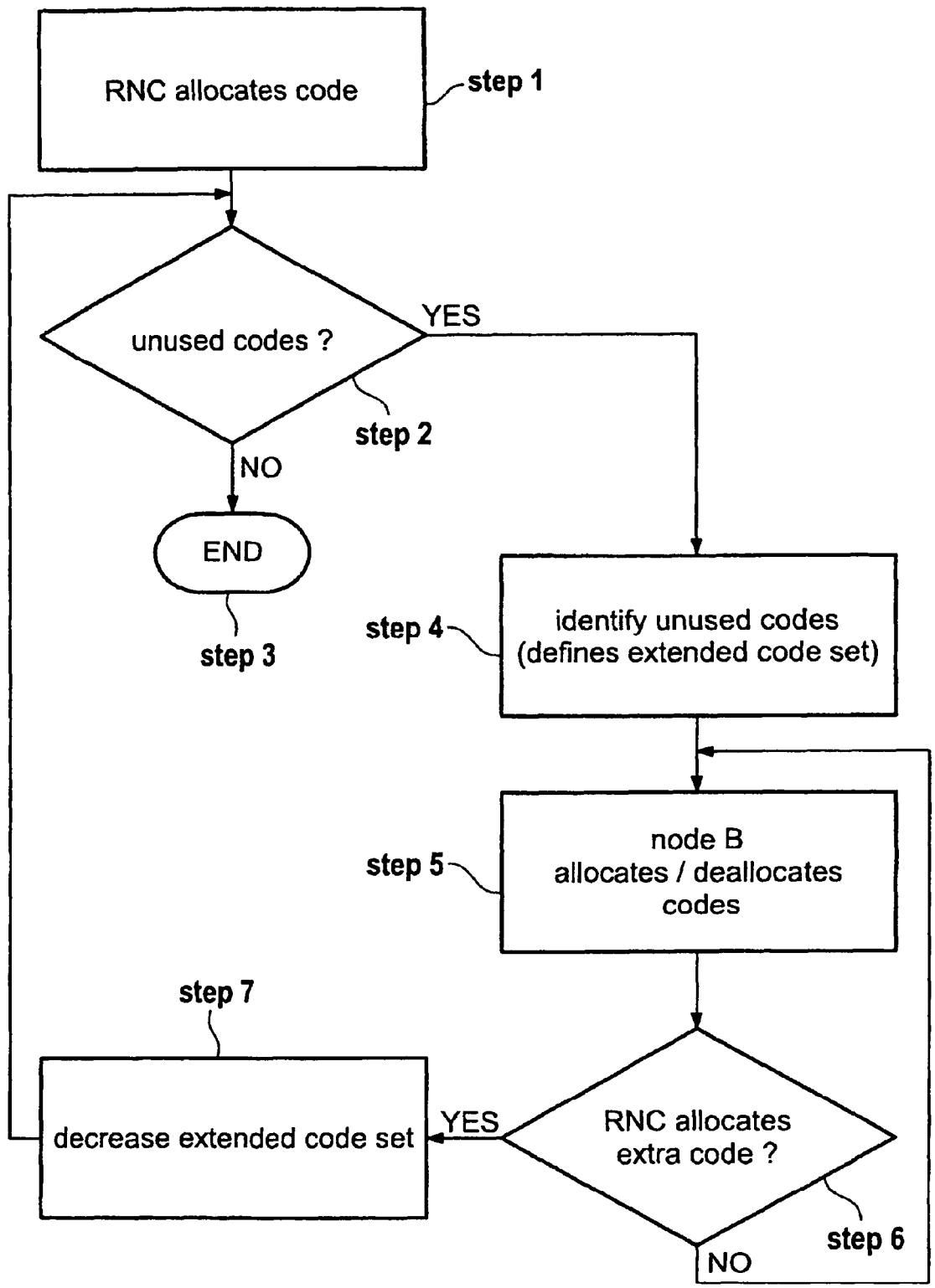
FIG. 3 shows a flowchart illustrating the invention.

FIG. 1 shows a UMTS system according to the prior art having a cell-like structure. Cells 10, 10', 10" each have node B's 3, 3', 3" which service the user equipments 4, 4' and 4".

Each node B 3, 3', 3" is connected to RNC 2 via cables 11, 11' and 11". A handover from a first cell to a second cell, for example from cell 10 to cell 10', is performed under the supervision of RNC 2. For that purpose a user equipment 4 constantly measures the radio link quality and sends the data via node B 3 to RNC 2. When user equipment 4 reaches the boundary between cell 10 and cell 10' the radio link quality between user equipment 4 and node B 3 deteriorates, whereas the radio link quality from user equipment 4 to node B 3' improves. RNC 2 decides when a handover should be done and informs the node B's 3, 3' accordingly.

FIGS. 2a and 2b show the radio resourced management (RRM) scheme for HSDPA according to the prior art. In the WCDMA scheme of UTRA/FDD orthogonal spreading or channelisation codes of variable length are used. These codes are organized in a code tree. In the example shown a code length of SF=16 (SF=spreading factor) which is the root of two codes of length 32 and so on. HS-DSCH are transmitted with the fixed spreading factor, which means that a node B has to monitor the availability of N=16 channelisation codes.

FIG. 2a shows the RRM scheme from the perspective of the RNC. The bottom part 5 represents a contiguous set of six HS-DSCH channelisation codes $C_{16,15}$ ... $C_{16,10}$. These channelisation codes are already allocated by the RNC and serve to enable HSDPA downlinks. The second block 7 represents a contiguous set of four channelisation codes $C_{16,9}$ ... $C_{16,6}$. These channelisation codes are currently unused but can still be allocated by the RNC if there is an increased demand for HSDPA downlinks. Thus the four HS-DSCH channelisation codes in block 7 represent a reserve for the RNC 2. Block 8 represents a contiguous set of four channelisation codes $C_{16,5}$ ... $C_{16,2}$ used for DCH channels and HS-SCCH channels. Block 9 on the top represents a forth contiguous set of channelisation codes used for common channels containing 2 channelisation codes.

As can be derived from FIG. 2a a total number of four HS-DSCH channelisation codes in block 7 is not used. The unused HS-DSCH channelisation codes represent unused radio resources, which means that the resources of the wireless communication system are not efficiently used.

FIG. 2b shows the radio resource management scheme for HSDPA from the perspective of the node B. A comparison of FIG. 2b with FIG. 2a shows that the two figures are identical. This means that in the prior art the perspectives of the node B and the RNC are identical. However, it should be emphasized, that according to the prior art the node B is not arranged to identify the unused HS-DSCH channelisation codes.

The flowchart of FIG. 3 illustrates the method according to the invention. In step 1 the RNC allocates M<=N HS-DSCH channelisation codes for a node B such that a node B can serve user equipments. In step 2 the node B determines if there are unused channelisation codes. If there aren't the method stops at step 3 and step 2 is repeated later on to check if there are changes concerning the use of channelisation codes.

If there are unused channelisation codes the node B determines them in step 4. They define the extended code set. In step 5 the node B allocates a code from the extended code set to serve a UE.

If the RNC does not allocate an additional code in step 6, the node B is free to use all codes of the extended code set to serve UE's such that step 5 may be repeated accordingly. As a matter of fact, the node B also deallocates channelisation codes of the extended code set in step 5 when connections are terminated.

If the RNC allocates an additional code in step 6 the extended code set is reduced in step 7 by 1 channelisation code. If the excluded code has been used the transmission to the UE is stopped. The method then proceeds with step 2. If the RNC does not allocate an additional code in step 6 the method proceeds with step 5. As a matter of fact, the node B may reallocate codes of the extended code set if it has stopped serving a UE.

FIGS. 4a and 4b shows the allocation of HS-DSCH channelisation codes in the new RRM scheme of a WCDMA based wireless communication system using HSDPA. In this case the method described above has been used. 16 channelisation codes were available, whereby N=10 of them were HS-DSCH channelisation codes.

FIG. 4a, which shows the RNC view, is again identical to FIGS. 2a and 2b. This means that from the perspective of the RNC the method according to the invention shows no changes. In other words, the method is compatible with existing standards. In particular with the above mentioned standards of the third generation partnership project.

FIG. 4b shows the allocation of HS-DSCH channelisation codes from the perspective of the node B.

In a first step a number of M=6 HS-DSCH channelisation codes are allocated upon request by a RNC 2 such that a node B 3 can service user equipments 4. Given the above terminology these are the HS-DSCH channelisation codes $C_{16,15}$ ... $C_{16,10}$ as SF=16. These HS-DSCH channelisation codes represent the minimum HS-DSCH channelisation code set.

The number of HS-DSCH channelisation codes can be chosen by the RNC 2 according to the traffic in the cell. FIGS. 3a and 3b thus represent the allocation situation at a given time. At a later time however M might be smaller or larger than six.

In practise the minimum HS-DSCH channelisation code set defined by the RNC needs only infrequent modifications. The reason is that the channelisation code space available in a cell cannot be fully used for the transmission of common channels or dedicated channels such that the minimum HS-DSCH channelisation code set is defined in a rather static way. As a consequence the higher layer signalling overhead, i.e. the signalling between the RNC and the node B for the allocation of HS-DSCH channelisation codes, is particularly low.

In a second step the node B identifies which of the N-M=10-6=4 channelisation codes are currently unused for transmissions. These are the unused HS-DSCH channelisation codes in block 7, namely the HS-DSCH channelisation codes $C_{16,9}$ ... $C_{16,6}$. These 4 HS-DSCH channelisation codes define a extended HS-DSCH channelisation code set.

In a third step the node B can autonomously allocate these HS-DSCH channelisation codes $C_{16,9}$ ... $C_{16,6}$ in block 5 for servicing UE's. There is no change for the channelisation codes used for DCH channels and HS-SCCH channels in block 8 or for the channelisation codes for common channels in block 9. The advantage of the method is that the HS-DSCH channelisation codes, which in the prior art have not been used, are now available via the extended HS-DSCH channelisation code sets for servicing purposes. This makes a better use of the radio resources available.

Adding a channelisation code to the extended HS-DSCH channelisation code set, or removing a channelisation code from the extended HS-DSCH channelisation code set takes only update periods of roughly two milliseconds. This adding and removing is autonomously done by the node B, i.e. without intervention by the RNC.

The extended channelisation code set in block 6 is dynamically determined. If the RNC allocates an additional channelisation code it is free to do so, and the additional HS-DSCH channelisation code would be $C_{16,9}$. As a consequence, the new minimum HS-DSCH channelisation code set will be $C_{16,15}$ to $C_{16,9}$, and the new extended HS-DSCH channelisation code set will be $C_{16,8} \ldots C_{16,6}$. As can be seen, the number of channelisation codes in the minimum HS-DSCH channelisation code set is reduced by one, whereas the number of channelisation codes in the extended HS-DSCH channelisation code set is increased by one. Likewise, it is also possible to decrease the number of channelisation codes in the minimum HS-DSCH channelisation code set, and to increase the number of channelisation codes in the extended HS-DSCH channelisation code set.

If, for example, the RNC 2 reserves a variable number of dedicated channels and 5 channelisation codes for HS-DSCH transmission, then for a UE with excellent channel conditions (for example with line-of-sight conditions), the HS-DSCH throughput is contrained by the available 5 HS-DSCH channelisation codes. With the method described therein this constraint is removed such that the throughput is increased.

In all cases the extended channelisation code set is a contiguous HS-DSCH channelisation code set. As an example the new extended HS-DSCH channelisation code set $C_{16,8} \ldots C_{16,6}$ contains $C_{16,8}$, $C_{16,7}$, and $C_{16,6}$. The second index is 8, 7 and 6 respectively, and this sorted set of numbers represent contiguous numbers. Using a contiguous HS-DSCH channelisation code set means that the probability the channelisation codes can be used by the node B for inclusion in the extended HS-DSCH code set is maximized.

A system which carries out the above method is a WCDMA system operating in the UTRA/FDD mode fully compatible with a 3GPP Release 5 standard and using HSDPA.

Another aspect of the invention refers to a node B according to the WCDMA standard, particularly a node B arranged to operate in the UTRA/FDD mode of WCDMA, which is adapted to carry out the method explained above. It comprises a computer program product whereby the computer program product is directly loadable in the internal memory of the node B, and comprises software code portions for performing the method as described above.

LIST OF REFERENCE NUMERALS 01 communication system
02 radio network controller (RNC)
03 node B
03' node B
03" node B
04 user equipment
05 minimum HS-DSCH code set
05' codes for HS-DSCH
06 extended HS-DSCH code set
07 unused code set
08 codes for DCH and HS-SCCH
09 codes for common channels
10 cell
10' cell
10" cell
11 cable
11' cable
11" cable

The invention claimed is:

1. A method for allocating HS-DSCH channelisation codes in a WCDMA based wireless communication system using HSDPA and having a total number of N HS-DSCH channelisation codes, whereby
   a) a radio network controller allocates M<=N HS-DSCH channelisation codes for a node B such that the node B can serve user equipments, the M channelisation codes defining the minimum code set,
   b) the node B identifies which of the N-M channelisation codes are currently unused for transmissions,
   c) the node B autonomously allocates at least one of the unused channelisation codes for servicing UE's.

2. The method according to claim 1, wherein the system is a WCDMA system, in particular a WCDMA system operating in the UTRA/FDD mode, or a CDMA 2000 system.

3. The method according to claim 1, wherein the system is providing HSDPA according to the standard 3GPP Release 5 or beyond.

4. The method according to claim 1, wherein the channelisation codes are OVSF codes whereby the OVSF codes $C_{SF,i}$ have an index SF representing the spreading factor and a second index i being an integer number, and that the OVSF codes of the N-M channelisation codes form a contiguous code set with respect to the second index i.

5. The method according to claim 1, wherein for channelisation codes $C_{SF,1}, C_{SF,2}, C_{SF,3}, \ldots, C_{SF,SF-1}$ of a code tree with SF being the spreading factor
   a) the codes $C_{SF,SF-1} \ldots C_{SF,SF-M}$ are chosen for the minimum HS-DSCH code set,
   b) the codes $C_{SF,SF-1-M} \ldots C_{SF,SF-N}$ are chosen for the extended code set,
   c) the codes $C_{SF,SF-1-N} \ldots C_{SF,SF-k}$ are chosen for DCH and HS-SCCH channels,
   d) the codes $C_{SF,SF-1-k} \ldots C_{SF,0}$ are chosen for common channels, whereby M,N and k are integers.

6. The method according to claim 1, wherein it is at least partially carried out by means of a computer program.

7. A computer program product, the computer program product comprising a computer readable medium, having thereon computer program code means, when said program is loaded, to make the computer executable for executing a method for allocating HS-DSCH channelisation codes in a WCDMA based wireless communication system using HSDPA and having a total number of N HS-DSCH channelisation codes, whereby
   a) a radio network controller allocates M<=N HS-DSCH channelisation codes for a node B such that the node B can serve user equipments, the M channelisation codes defining the minimum code set,
   b) the node B identifies which of the N-M channelisation codes are currently unused for transmissions,
   c) the node B autonomously allocates at least one of the unused channelisation codes for servicing UE's.

8. A node B adapted to operate according to the WCDMA standard, and comprising a computer program product comprising a computer readable medium, having thereon computer program code means, when said program is loaded, to make the computer executable for executing a method for allocating HS-DSCH channelisation codes in a WCDMA based wireless communication system using HSDPA and having a total number of N HS-DSCH channelisation codes, whereby
   a) a radio network controller allocates M<=N HS-DSCH channelisation codes for a node B such that the node B can serve user equipments, the M channelisation codes defining the minimum code set, b) the node B identifies which of the N-M channelisation codes are currently unused for transmissions, c) the node B autonomously allocates at least one of the unused channelisation codes for servicing UE's.

9. A method for allocating HS-DSCH channelisation codes in a WCDMA based wireless communication system using HSDPA and having a total number of N HS-DSCH channelisation codes, whereby a) the radio network controller allocating a set of M channelisation codes from a set of N HS-DSCH channelisation codes, wherein M<N, the M channelisation codes defining a minimum code set and the M channelisation codes being allocated for a node B such that the node B can serve user equipments and a remaining set of N-M channelisation codes being unallocated by the radio network controller, b) the node B identifying which of the N-M channelisation codes, which were unallocated by the radio network controller, are currently unused for transmissions; and c) the node B autonomously allocating at least one of the unused channelisation codes for servicing UE's.

10. A method for allocating HS-DSCH channelisation codes for a WCDMA based wireless communication system using HSDPA and having a total number of N HS-DSCH channelisation codes, whereby a) a radio network controller allocates M not greater than N HS-DSCH channelisation codes for a node B such that the node B can serve user equipments, the M channelisation codes defining the minimum code set, the radio network controller signalling the HS-DSCH channelisation codes to the node B, b) the node B identifies which of the N-M channelisation codes are currently unused for transmissions; and c) the node B autonomously allocates at least one of the unused channelisation codes for servicing UE's.

* * * * *